(12) United States Patent
Shono et al.

(10) Patent No.: US 10,931,158 B2
(45) Date of Patent: Feb. 23, 2021

(54) ROTOR, ROTARY ELECTRIC MACHINE, AND COMPRESSOR

(71) Applicant: Mitsubishi Electric Corporation, Tokyo (JP)

(72) Inventors: Kazuhiro Shono, Tokyo (JP); Shinichi Ito, Tokyo (JP); Yuki Tamura, Tokyo (JP); Kanji Shinkawa, Tokyo (JP); Mizuho Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/327,013

(22) PCT Filed: Sep. 13, 2017

(86) PCT No.: PCT/JP2017/033015
§ 371 (c)(1),
(2) Date: Feb. 21, 2019

(87) PCT Pub. No.: WO2018/061768
PCT Pub. Date: Apr. 5, 2018

(65) Prior Publication Data
US 2019/0190337 A1    Jun. 20, 2019

(30) Foreign Application Priority Data

Sep. 29, 2016 (JP) .............................. JP2016-190472

(51) Int. Cl.
*H02K 21/14* (2006.01)
*H02K 1/30* (2006.01)
(Continued)

(52) U.S. Cl.
CPC ............... *H02K 1/32* (2013.01); *F04B 35/04* (2013.01); *F04C 29/0085* (2013.01); *H02K 1/22* (2013.01);
(Continued)

(58) Field of Classification Search
CPC ............ H02K 1/14; H02K 21/14; H02K 9/12; H02K 3/50
(Continued)

(56) References Cited

U.S. PATENT DOCUMENTS

2012/0086291 A1    4/2012  Deblock et al.

FOREIGN PATENT DOCUMENTS

| JP | H0865933 A | 3/1996 |
|---|---|---|
| JP | 2006067777 A | 3/2006 |

(Continued)

OTHER PUBLICATIONS

Machine Translation JP2015211573 (Year: 2015).*
(Continued)

*Primary Examiner* — Jose A Gonzalez Quinones
(74) *Attorney, Agent, or Firm* — Buchanan Ingersoll & Rooney PC

(57) ABSTRACT

A plurality of magnet holes are arranged in a circumferential direction. Void portions are provided at both ends in the circumferential direction of each magnet hole. Flow holes penetrating in the axial direction are formed, between the magnet holes adjacent in the circumferential direction, on an inner side in a radial direction with respect to the magnet holes. Each core has: first groove portions via which the void portions and the flow holes communicate with each other; and second groove portions via which the void portions and the outer circumferences of the cores communicate with each other and which serve as discharge ports. The end plates have: first holes through which the flow holes are exposed and which serve as intake ports; and tab portions which are located on downstream sides in a rotation direction of the first holes and which assist air intake.

20 Claims, 14 Drawing Sheets

(51) Int. Cl.
H02K 9/06 (2006.01)
H02K 1/22 (2006.01)
H02K 1/32 (2006.01)
H02K 1/27 (2006.01)
F04B 35/04 (2006.01)
H02K 7/14 (2006.01)
F04C 29/00 (2006.01)
H02K 9/08 (2006.01)

(52) U.S. Cl.
CPC ............... *H02K 1/27* (2013.01); *H02K 1/276* (2013.01); *H02K 1/30* (2013.01); *H02K 7/14* (2013.01); *H02K 9/06* (2013.01); *H02K 9/08* (2013.01); *H02K 21/14* (2013.01)

(58) Field of Classification Search
USPC .......................... 310/58, 61, 156.01, 156.53
See application file for complete search history.

(56) References Cited

FOREIGN PATENT DOCUMENTS

| JP | 2007028876 | A |   | 2/2007 |
|----|------------|---|---|--------|
| JP | 2009159763 | A |   | 7/2009 |
| JP | 2009177944 | A | * | 8/2009 |
| JP | 2009177944 | A |   | 8/2009 |
| JP | 2010028908 | A | * | 2/2010 |
| JP | 2011193623 | A |   | 9/2011 |
| JP | 2012085517 | A |   | 4/2012 |
| JP | 2012165600 | A | * | 8/2012 |
| JP | 2012165600 | A |   | 8/2012 |
| JP | 2013090479 | A |   | 5/2013 |
| JP | 2015211573 | A | * | 11/2015 |
| JP | 2015211573 | A |   | 11/2015 |
| JP | 2015231262 | A |   | 12/2015 |

OTHER PUBLICATIONS

Machine Translation JP2009177944 (Year: 2009).*
Machine Translation JP2012165600 (Year: 2012).*
Machine Translation JP2010028908 (Year: 2010).*
The extended European Search Report dated Sep. 19, 2019, by the European Patent Office in corresponding European Patent Application No. 17855724.5-1201. (8 pages).
International Search Report (PCT/ISA/210) dated Nov. 14, 2017, by the Japan Patent Office as the International Searching Authority for International Application No. PCT/JP2017/033015.
Written Opinion (PCT/ISA/237) dated Nov. 14, 2017, by the Japan Patent Office as the International Searching Authority for International Application No. PCT/JP2017/033015.
Office Action dated Jun. 1, 2020, by the Chinese Patent Office in corresponding Chinese Patent Application No. 2001780045611.X and English translation of the Office Action. (15 pages).
The Second Office Action dated Nov. 3, 2020, by the The State Intellectual Property Office of People's Republic of China, in corresponding Chinese Patent Application No. 201780045611.X. (13 pages including partial English translation).
Decision of Refusal issued by the Chinese Patent Office in corresponding Chinese Patent Application No. 201780045611.X dated Dec. 31, 2020 (4 pages). *English translation to follow*.

* cited by examiner

ROTOR, ROTARY ELECTRIC MACHINE, AND COMPRESSOR

TECHNICAL FIELD

The present invention relates to a rotor, a rotary electric machine, and a compressor that are capable of efficiently cooling a stator and permanent magnets of a rotor.

BACKGROUND ART

Conventionally, in a rotary electric machine such as an interior permanent magnet (IPM) motor using a rotor in which permanent magnets are embedded, the temperature of the permanent magnets increases due to heat generation in the rotary electric machine during operation and thus a magnetic flux for generating torque is reduced. Accordingly, as a method for cooling a rotor, it has been conventionally proposed that each one sheet at both ends in the axial direction of a stacked core of a rotor has an inclined blade at an edge portion of a wind hole. With this configuration, the amount of wind to flow into a wind hole during rotation of the rotor increases, and the permanent magnets are effectively cooled through cooling of the stacked core by the wind (see, for example, Patent Document 1).

CITATION LIST

Patent Document 1: Japanese Laid-Open Patent Publication No. 8-65933 (paragraphs [0009]-[0011], FIGS. 1, 2)

SUMMARY OF THE INVENTION

Problems to be Solved by the Invention

In the conventional rotor and rotary electric machine, wind flow is limited within the wind hole and thus there is a problem that such rotor and rotary electric machine are not suitable for directly cooling the permanent magnets.

In addition, wind flow passes in the axial direction through the stacked core of the rotor, and thus there is a problem that such rotor and rotary electric machine are not suitable for cooling the stator.

The present invention has been made to solve the above problems, and an object of the present invention is to provide a rotor, a rotary electric machine, and a compressor that are capable of efficiently cooling a stator and permanent magnets of the rotor.

Solution to the Problems

A rotor according to the present invention includes: a stacked core formed by stacking a plurality of cores; permanent magnets provided in magnet holes formed to penetrate in an axial direction in the stacked core; end plates provided at both ends in the axial direction of the stacked core; and a rotary shaft provided to a through hole formed at a center in the stacked core and the end plates, the rotary shaft fixing the stacked core and the end plates. A plurality of the magnet holes in which the permanent magnets are provided are arranged in a circumferential direction. Void portions in which the permanent magnets are not present are provided at both ends in the circumferential direction of each magnet hole. The stacked core has flow holes which penetrate in the axial direction and each of which is formed, between the magnet holes adjacent in the circumferential direction, on an inner side in a radial direction with respect to the magnet holes. Some or all of the cores have first groove portions via which the void portions of the magnet holes and the flow holes communicate with each other, and second groove portions via which the void portions of the magnet holes and outer circumferences of the cores communicate with each other and which serve as discharge ports. At least one of the end plates has first holes through which the flow holes are exposed and which serve as intake ports, and tab portions which are located on downstream sides in a rotation direction of the first holes and which assist air intake.

A rotary electric machine according to the present invention includes: the rotor; and a stator provided so as to be spaced from an outer circumferential surface of the rotor and concentric with the rotor.

A compressor according to the present invention includes: a compression mechanism portion; and the rotary electric machine which drives the compression mechanism portion.

Effect of the Invention

The rotor, the rotary electric machine, and the compressor according to the present invention can efficiently cool the stator and the permanent magnets of the rotor.

DESCRIPTION OF EMBODIMENTS

Embodiment 1

Figure 1:
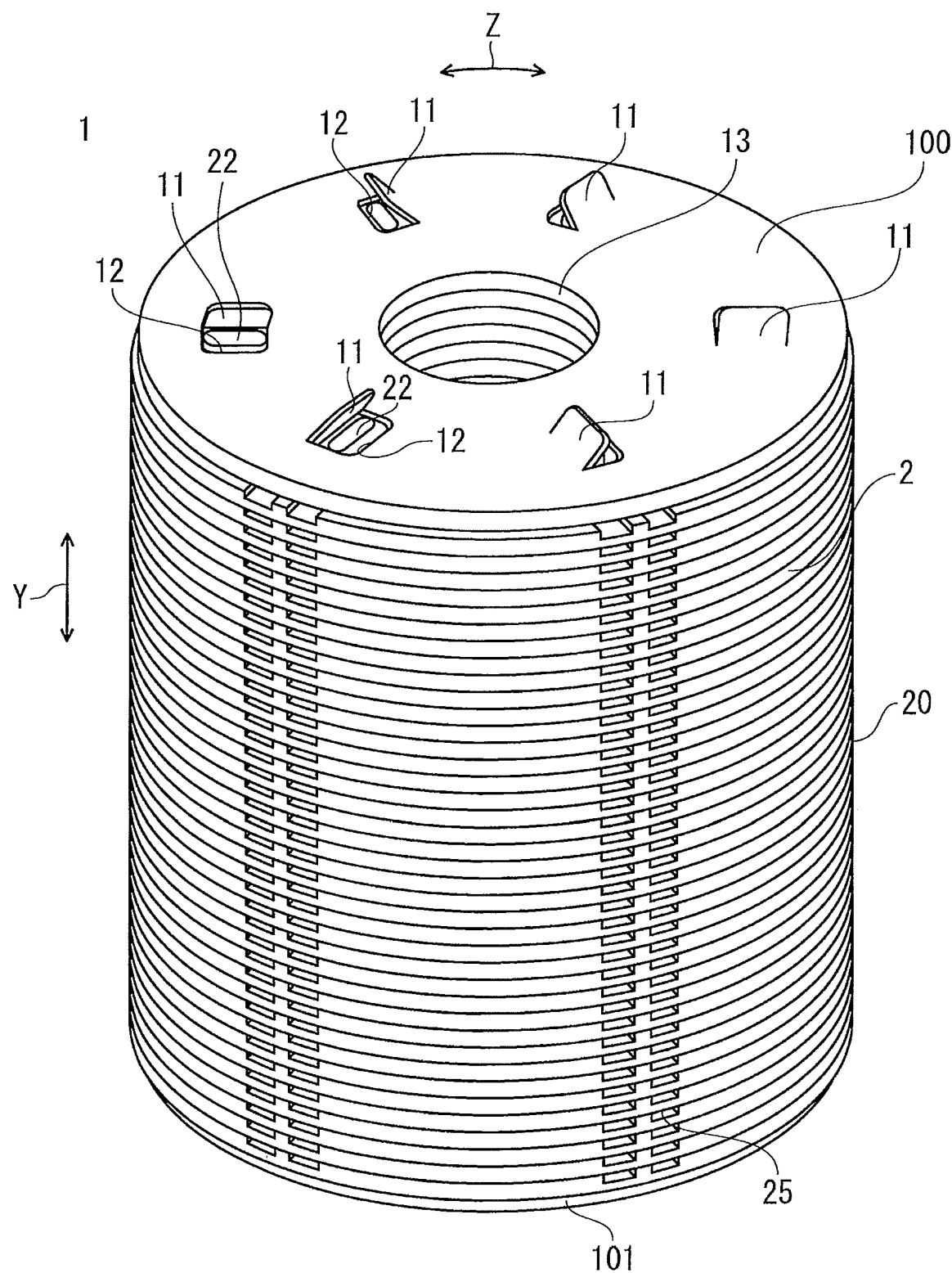
FIG. 1 is a perspective view showing a rotor according to embodiment 1 of the present invention.
Figure 2:
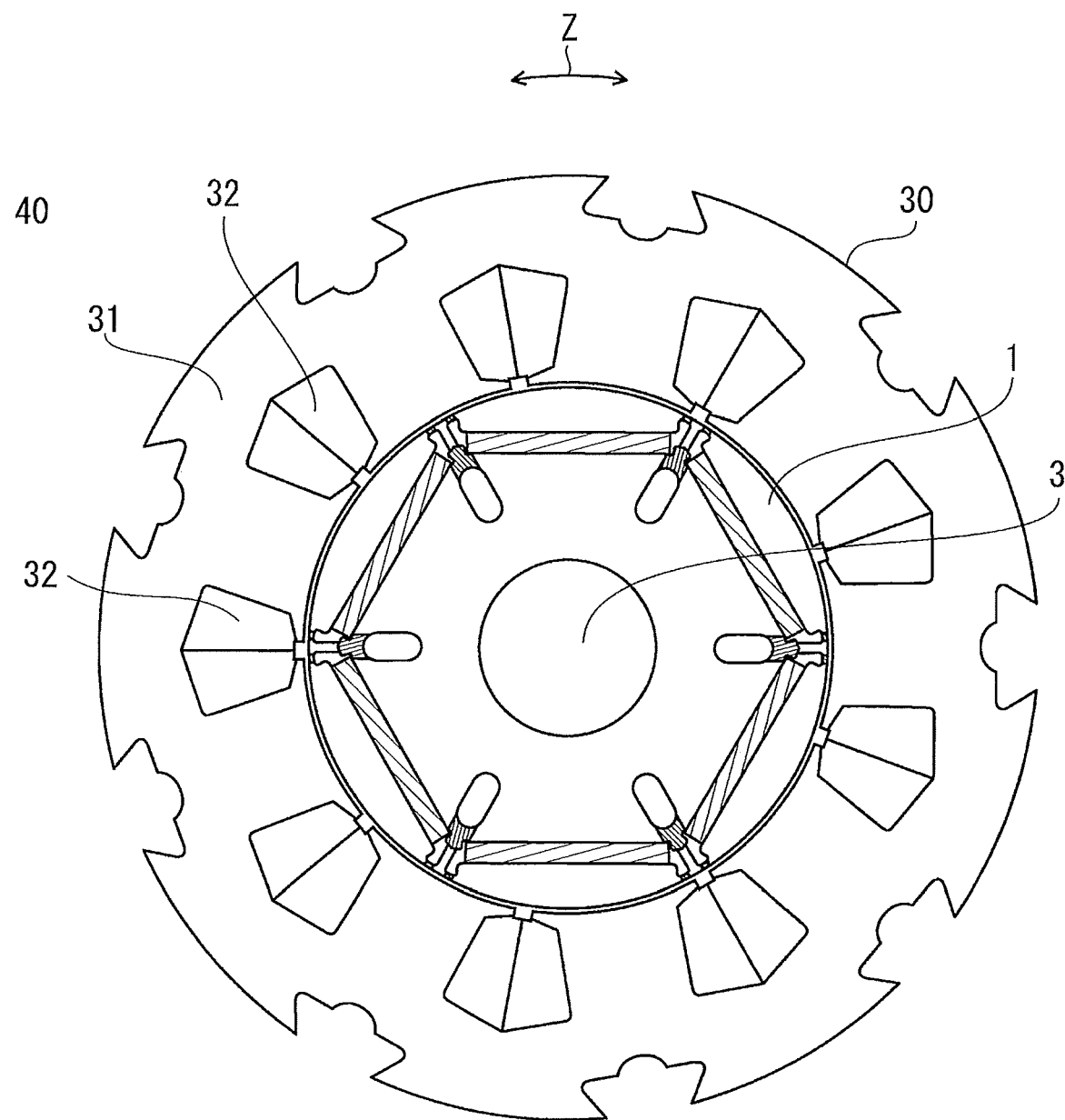
FIG. 2 is a sectional view showing the configuration of a rotary electric machine using the rotor shown in FIG. 1.
Figure 3:
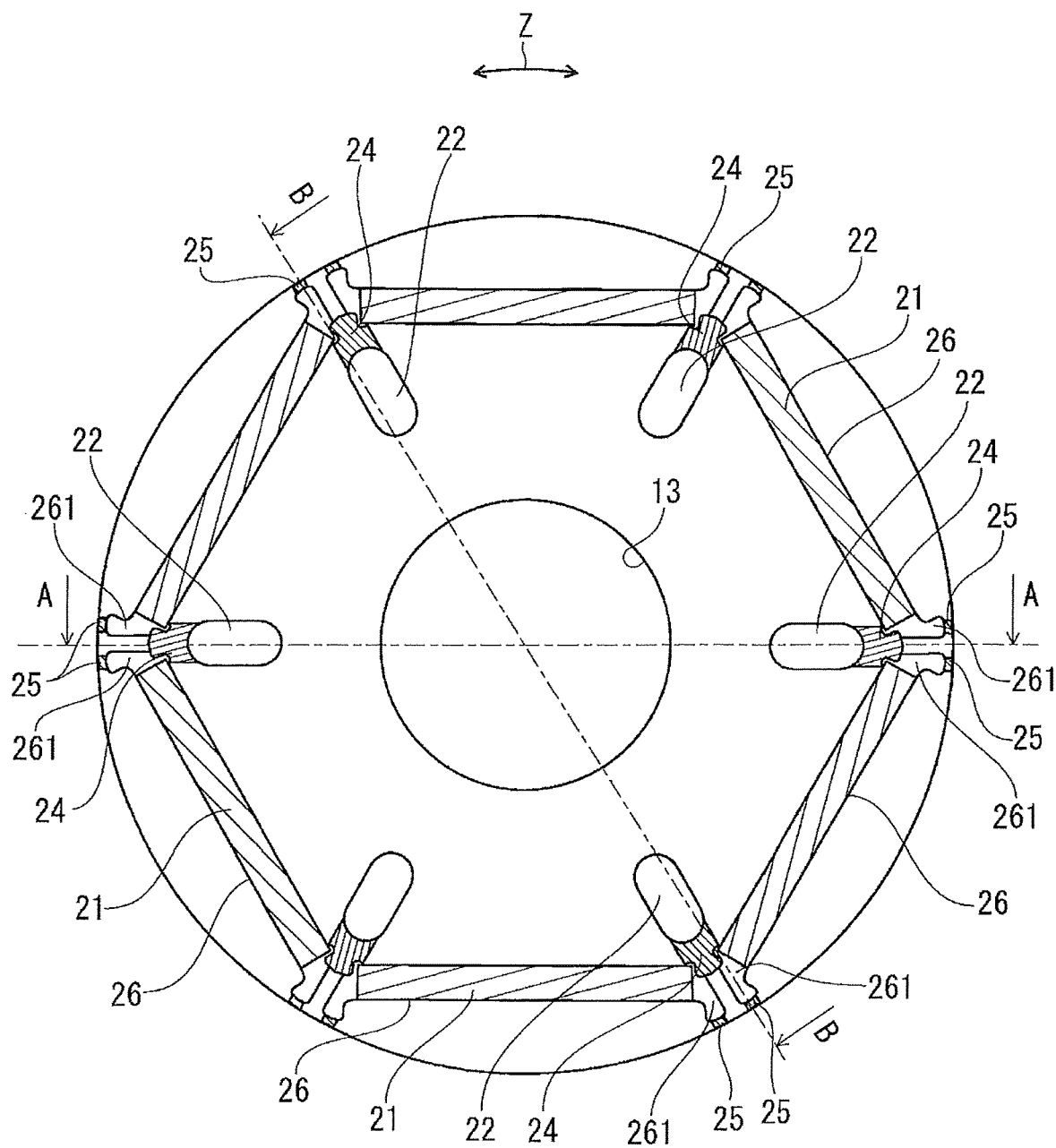
FIG. 3 is a plan view showing the configuration of a core of the rotor shown in FIG. 1.

Hereinafter, embodiments of the invention of the present application will be described. FIG. 1 is a perspective view showing a rotor of a rotary electric machine according to embodiment 1 of the present invention. FIG. 2 is a sectional view showing the configuration of the rotary electric machine using the rotor shown in FIG. 1. FIG. 3 is a plan view showing the configuration of a core of the rotor shown in FIG. 1.

Figure 4:
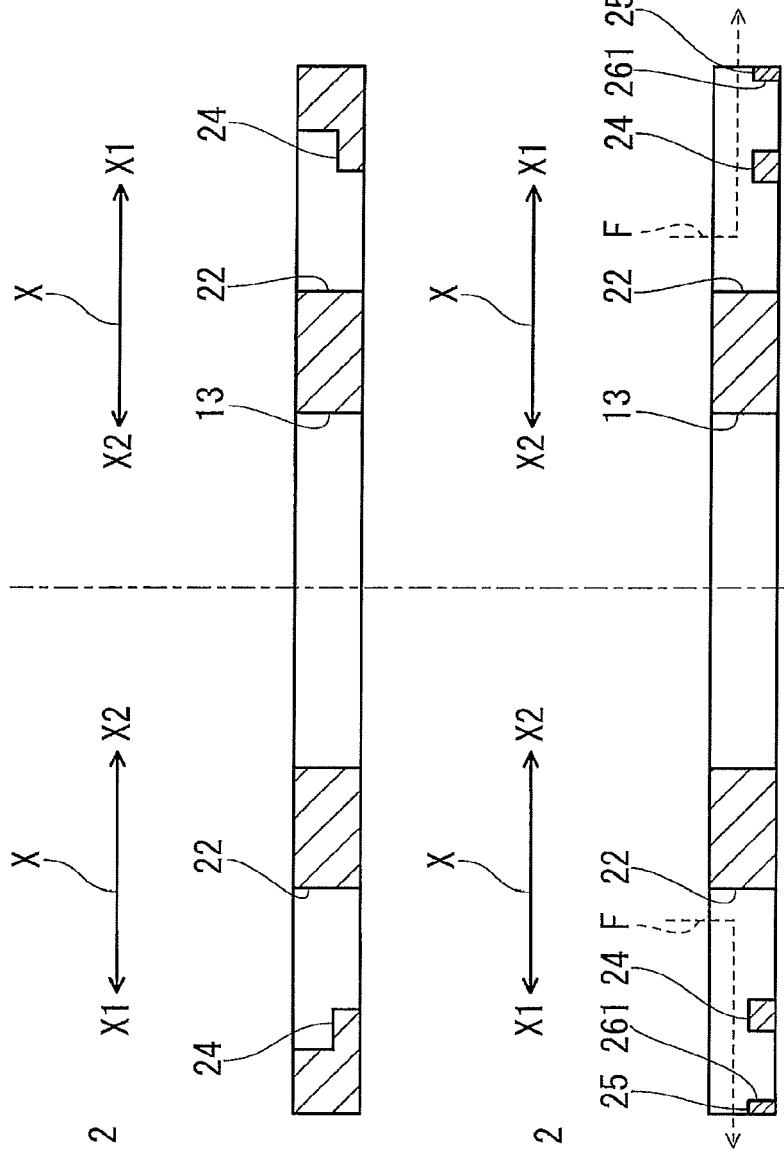
FIG. 4A is sectional view along A-A line of the core shown in FIG. 3.
FIG. 4B is sectional view along B-B line of the core shown in FIG. 3.
Figure 5:
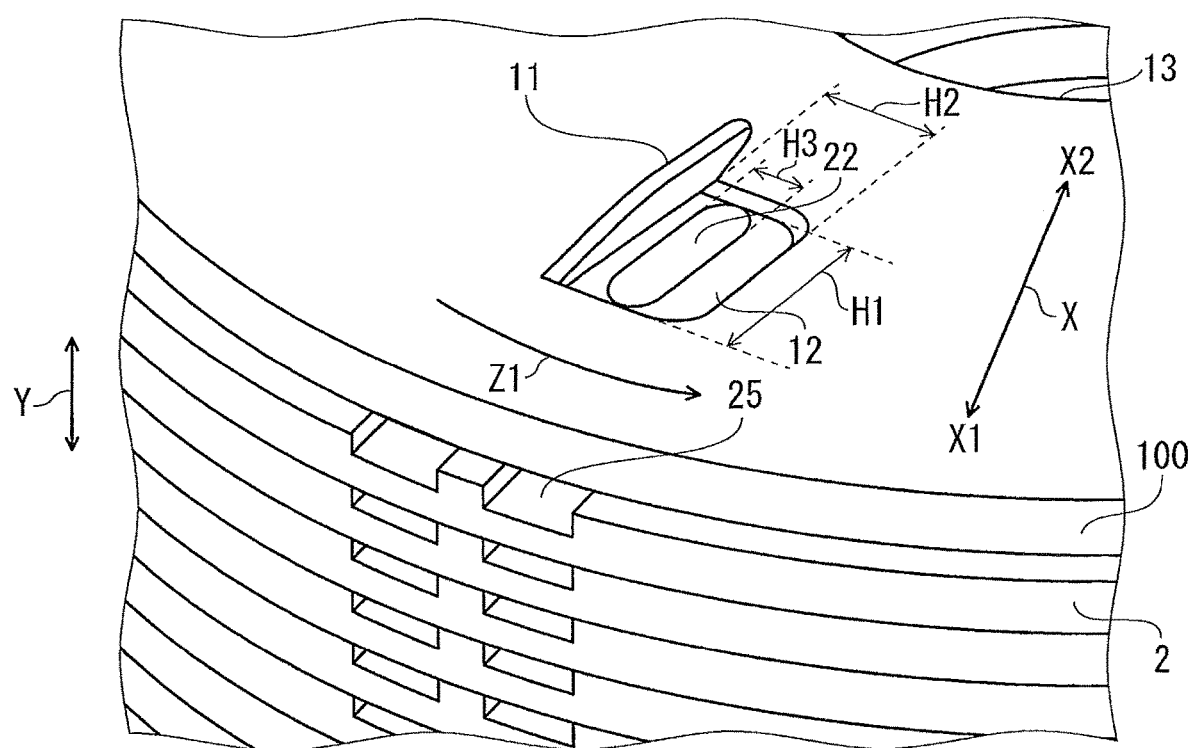
FIG. 5 is a perspective view showing the details of a tab portion of the rotor shown in FIG. 1.
Figure 6:
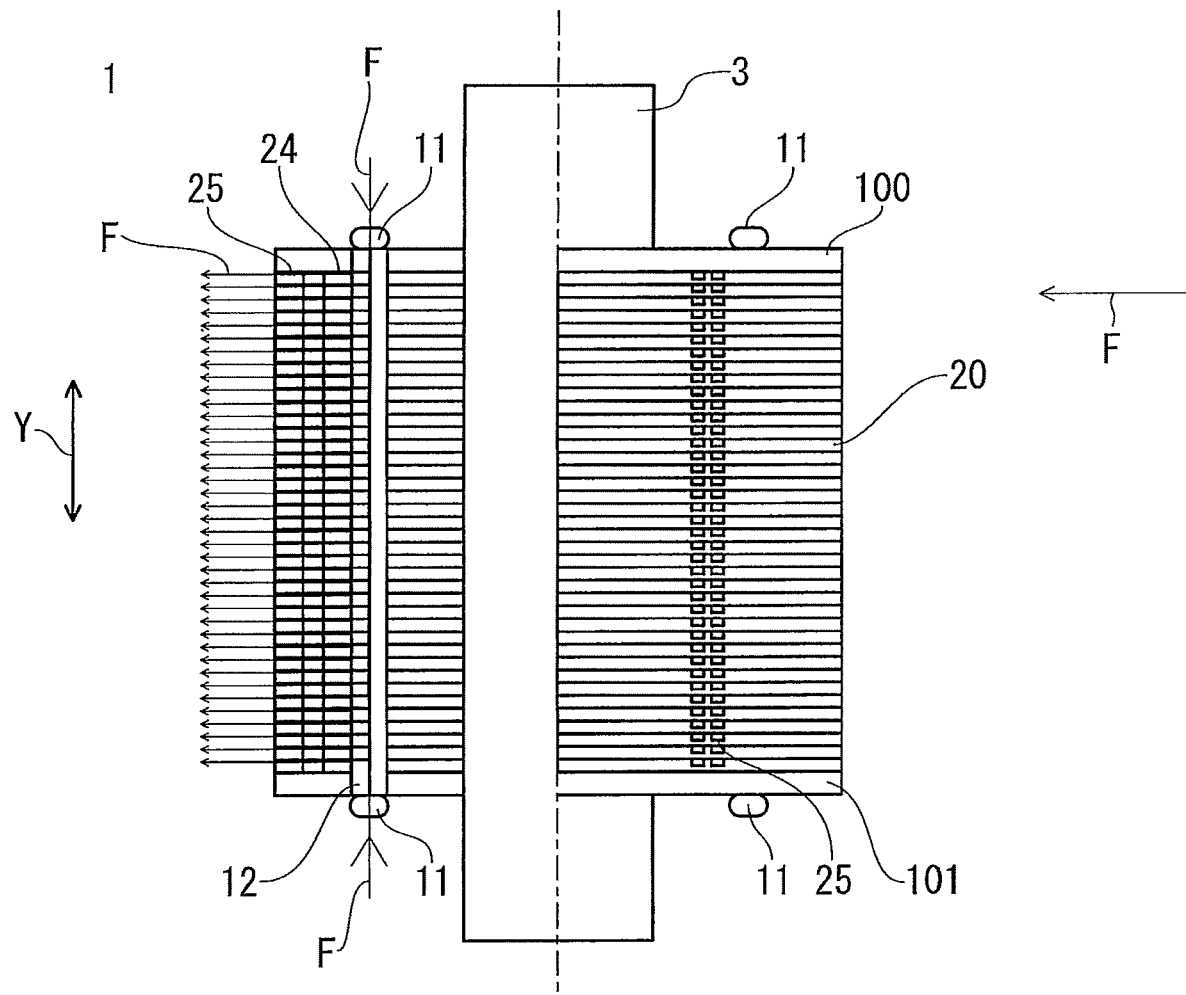
FIG. 6 is a half sectional view showing flow of a coolant in the rotor shown in FIG. 1.
Figure 7:
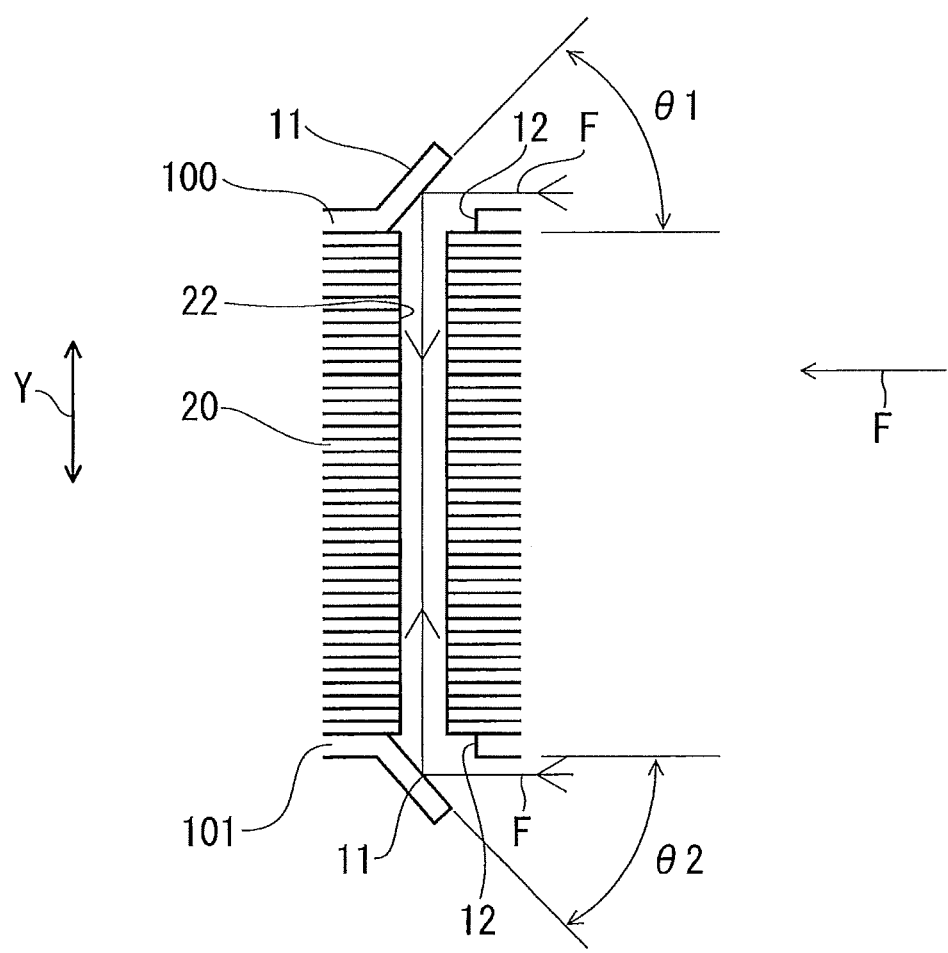
FIG. 7 is an enlarged sectional view showing the details of flow of the coolant in the rotor shown in FIG. 6.

FIG. 4A is a sectional view along A-A line of the core shown in FIG. 3. FIG. 4B is a sectional view along B-B line of the core shown in FIG. 3. FIG. 5 is a perspective view showing the details of a tab portion of the rotor shown in FIG. 1. FIG. 6 is a left-half sectional view showing flow of a coolant in the rotor shown in FIG. 1. FIG. 7 is an enlarged sectional view showing the details of flow of the coolant in the rotor shown in FIG. 6.

In the drawings, a rotor 1 is composed of a stacked core 20, permanent magnets 21, end plates 100, 101, and a rotary shaft 3. The stacked core 20 is formed by stacking a plurality of cores 2 in an axial direction Y. In the stacked core 20, magnet holes 26 are formed to penetrate in the axial direction Y. A plurality of magnet holes 26 are provided in a circumferential direction Z. Here, six (six poles) magnet holes 26 are arranged in the circumferential direction Z. The permanent magnets 21 are arranged in the respective magnet holes 26. Each magnet hole 26 has, at both ends in the circumferential direction Z, void portions 261 in which the permanent magnets 21 are not present. Therefore, the void portions 261 are formed to penetrate in the axial direction Y.

The stacked core 20 has flow holes 22 which penetrate in the axial direction Y and each of which is formed, between the magnet holes 26 adjacent in the circumferential direction Z, on an inner side X2 in a radial direction X with respect to the magnet holes 26. The shape of each flow hole 22 is formed such that a width H1 in the radial direction X is greater than a width H3 in the circumferential direction Z. The end plates 100, 101 are provided at both ends in the axial direction Y of the stacked core 20. The main function of the end plates 100, 101 is to retain the permanent magnets 21 inside the magnet holes 26 of the stacked core 20, and normally, the end plates 100, 101 are provided, in close contact with the stacked core 20, at both ends in the axial direction Y of the stacked core 20. The rotary shaft 3 is provided to a through hole 13 formed to penetrate in the axial direction Y at the center in the stacked core 20 and the end plates 100, 101. The rotary shaft 3 fixes the stacked core 20 and the end plates 100, 101.

In the plurality of cores 2 composing the stacked core 20, the magnet holes 26, the through hole 13, and the flow holes 22 are formed. In addition, in particular, as shown in FIG. 3 and FIG. 4, each core 2 has: first groove portions 24 via which the void portions 261 of the magnet holes 26 and the flow holes 22 communicate with each other; and second groove portions 25 via which the void portions 261 of the magnet holes 26 and the outer circumference of the core 2 communicate with each other and which serve as discharge ports. Thus, the flow hole 22, the first groove portion 24, the void portion 261, and the second groove portion 25 are formed so as to communicate with each other toward an outer side X1 in the radial direction X of the core 2, i.e., communicate with each other to reach the outer circumference of the core 2. Each end plate 100, 101 has: first holes 12 through which the flow holes 22 are exposed and which serve as intake ports; and tab portions 11 which extend in the axial direction Y on the downstream sides in a rotation direction Z1 of the first holes 12 and which assist air intake.

In this configuration, the first holes 12 serving as intake ports for the coolant are provided at parts corresponding to the flow holes 22 in the end plates 100, 101, and merely by rotating the rotor 1, the coolant present in the second groove portions 25 and the void portions 261 of the magnet holes 26 is discharged, by a centrifugal force, toward the outer side X1 in the radial direction X from the second groove portions 25 serving as discharge ports. Then, the void portions 261 of the magnet holes 26 come to have a negative pressure, so that the coolant is sucked from the flow holes 22 via the first groove portions 24. Further, the flow holes 22 suck the coolant from the first holes 12 serving as intake ports in the end plates 100, 101. In this way, the coolant is sucked from the first holes 12 serving as intake ports in the end plates 100, 101, and then discharged through the second groove portions 25 serving as discharge ports, whereby flow F of the coolant as shown in the drawing can be obtained. It is noted that, in this case, the same coolant flow occurs no matter which direction the rotor 1 rotates.

The shape of each first hole 12 is formed such that a width H1 in the radial direction X is greater than a width H2 in the circumferential direction Z. Here, the shapes of the first holes 12 and the tab portions 11 are approximately rectangular (rectangle shape) as an example. However, without limitation thereto, the shapes may be an oval, a half-ellipse arc, a half-circular arc, or the like.

Here, in comparison between the area of the first hole 12 of the end plate 100 and the area of the flow hole 22, the area of the first hole 12 is set to be larger than the area of the flow hole 22. In this way, it is desirable that the entire flow hole 22 is exposed through the first hole 12. As shown in FIG. 7, angles $\theta 1$, $\theta 2$ between the surface on the first hole 12 side of the tab portion 11 and the end surface of each end plate 100, 101 are set to 30 deg to 60 deg.

The core 2 is formed by subjecting a magnetic thin sheet such as an electromagnetic steel sheet to coining by press working, etching, or the like. However, another method may be employed. The first groove portions 24 and the second groove portions 25 are formed by decreasing the thickness of the core 2 on the upper surface side in the axial direction Y, and may be formed at the same time as the magnet holes 26, the through hole 13, and the flow holes 22 or may be formed separately. As for the shapes of the first groove portions 24 and the second groove portions 25, without limitation to the shapes exemplified here, it is desirable to determine the shapes in consideration of ease of working for the first groove portions 24 and the second groove portions 25 while making a balance of flow path resistance in the entire flow path including the tab portions 11 by changing the width or the groove depth of the second groove portions 25, for example.

The permanent magnets 21 are made of sintered neodymium magnets. The end plates 100, 101 are formed by performing press working on a nonmagnetic thin-plate material such as a nonmagnetic SUS (stainless steel) thin plate. Therefore, the tab portions 11 which are formed by being cut and raised and the first holes 12 are formed at the same time. Although the cutting and raising method is shown as an example of the method for forming the tab portions 11, the working method is not limited thereto. The tab portions 11 and the end plates 100, 101 may be formed separately and then the tab portions 11 may be joined to the end plates 100, 101 by a method such as welding, brazing, or bonding. A rotary electric machine 40 is composed of the rotor 1 and a stator 30. The stator 30 is provided so as to be spaced from the outer circumferential surface of the rotor 1 and concentric with the rotor 1. The stator 30 includes a stator core 31 and windings 32.

Next, the flow F of the coolant in the rotor of the rotary electric machine in embodiment 1 configured as described above will be described with reference to FIG. 4, FIG. 6, and FIG. 7. On both end plates 100, 101 at both ends in the axial direction Y, the tab portions 11 are formed in the same direction with respect to the rotation direction Z1, and provided on the downstream sides in the rotation direction Z1 of the flow holes 22 provided in the cores 2 such that the tab portions 11 have angles θ1, θ2 (<90 deg) with respect to the upper surfaces of the end plates 100, 101.

Therefore, when the rotor 1 rotates, as described above, such flow that the coolant is sucked in the axial direction Y and then discharged toward the outer side X1 in the radial direction X occurs as long as the first holes 12 exist even if the tab portions 11 are not provided. Further, as shown in FIG. 6 and FIG. 7, the flow F of the coolant collides with each tab portion 11 so that the direction thereof changes toward the first hole 12, and thus the coolant passes the first hole 12 and is introduced into the flow hole 22 so as to be added to the coolant sucked by a centrifugal force, whereby the flow of the coolant increases. It is noted that, in the case of such a configuration using the tab portions 11, the rotation direction of the rotor 1 is limited in order to obtain the effect. Therefore, this configuration is particularly effective for a device such as a compressor in which the rotation direction of the rotor 1 is limited to one direction.

Then, as shown by flow F of the coolant in FIG. 4(B), the coolant sucked and introduced through the flow hole 22 passes the first groove portion 24 and the void portion 261 while cooling the permanent magnet 21, and then passes the second groove portion 25 to be discharged to the outer side X1 in the radial direction X of the rotor 1. Then, the coolant discharged to the outer side X1 in the radial direction X of the rotor 1 cools the stator core 31 and the windings 32 of the stator 30 located on the outer side X1 in the radial direction X of the rotor 1.

In this configuration, owing to the coolant flow path having the second groove portion 25 as a discharge port on the outer side X1 in the radial direction X, flow F (sucking) of the coolant by a centrifugal force occurs and further, flow F of the coolant forcibly caused by the tab portion 11 is added to the flow hole 22, whereby supply of the coolant is increased and flow F of the coolant toward the outer side X1 in the radial direction X of the core 2 of the rotor 1 is accelerated. Thus, the effect of cooling the permanent magnets 21 can be increased and the stator core 31 and the windings 32 of the stator 30 can be effectively cooled.

The angles θ1, θ2 of the tab portions 11 with respect to the end plates 100, 101 are set to 90 deg or smaller. This is because, as the angles θ1, θ2 become closer to 90 deg, the probability that the coolant colliding with and reflected by the tab portion 11 reaches the flow hole 22 decreases. In addition, as the angles θ1, θ2 become closer to 0 deg, the amount of the coolant that collides with the tab portion 11 decreases. In order to increase the coolant supply capability, it is desirable that the angles θ1, θ2 are in a range of 30 deg<θ1, θ2<60 deg, or more strictly, values around 45 deg.

In the present embodiment 1, as shown in FIG. 7, the case where the angles θ1, θ2 of the tab portions 11 on the end plates 100, 101 at both ends in the axial direction Y are set to the same angle, has been shown as an example. However, these angles are not limited thereto. For example, it is assumed that the temperature of the coolant differs between both ends in the axial direction Y of the rotor 1, e.g., in a compressor having a low-pressure shell structure, the temperature of a coolant present at an end in the axial direction Y close to the compression mechanism side is lower than the temperature of a coolant present on a side where refrigerating machine oil is stored at the opposite end in the axial direction Y. As described above, in the case where supply of the coolant from one of both ends is to be prioritized, the angle θ1 and the angle θ2 may be set to be different from each other.

Here, the case where the first groove portions 24 and the second groove portions 25 are provided to all the cores 2 of the stacked core 20 has been shown as an example. However, without limitation thereto, these groove portions may be provided to some of the cores 2 of the stacked core 20, e.g., may be provided in a specific area such as the vicinity of the center in the axial direction Y of the stacked core 20 or the lower end side in the axial direction Y thereof, or the core 2 having the first groove portions 24 and the second groove portions 25 may be provided in one out of every two cores. Such a configuration also provides the same effect.

In the rotor and the rotary electric machine of embodiment 1 configured as described above, in addition to flow in which the coolant present at the first groove portion, the void portion, and the second groove portion is discharged toward the outer side in the radial direction of the rotor by a centrifugal force during rotation, flow of the coolant forcibly caused by the tab portion is introduced to the first groove portion and the second groove portion via the flow hole, whereby flow of the coolant increases and the efficiency of cooling of the magnets and the windings is improved. In particular, even in the case where the rotation rate of the rotor is low and flow of the coolant due to a centrifugal force is insufficient, the coolant can be forcibly supplied by the tab portion. Further, since the coolant is supplied from both ends in the axial direction toward the center of the rotor, the flow amount of the coolant passing inside the rotor increases and thus the permanent magnet cooling efficiency is expected to be improved.

Further, the stator provided on the outer side is cooled by flow of the coolant discharged from the second groove portion of the rotor toward the outer side in the radial direction. Thus, the stator core and the windings of the stator are cooled.

The shapes of the flow holes and the first holes are each formed such that the width in the radial direction is greater than the width in the circumferential direction. Therefore, as compared to the case of a round hole having the same area, the coolant reflected by the tab portion can reach the flow hole via the first hole through a short distance. Thus, it is possible to enhance the coolant supply efficiency without increasing the magnetic resistance of the core. It is noted that the shapes of the flow holes and the first holes are not limited to the examples shown in the above embodiment 1, but for example, shapes such as an ellipse or a rectangle may be used, and any shapes in which the width in the circumferential direction is greater than the width in the radial direction may be used.

The angle between the surface on the first hole side of the tab portion and the end surface of the end plate is set to 30 deg to 60 deg. Thus, the coolant can be efficiently introduced into the flow hole, whereby the efficiency of cooling of the permanent magnets and the windings of the stator is further improved.

In the case of using the rotary electric machine 40 for driving a compressor, a swing mechanism portion of the compressor connected to an end of a shaft rotates eccentrically. Therefore, for the purpose of cancelling out the influence thereof, for example, a balancer molded with metal such as brass and having an approximately semicircular shape may be provided on one side (here, on the end plate 101 side as an example) in the axial direction Y of the rotor 1. In this case, approximately a half of the end plate 101 is located between the balancer and the stacked core 20. Therefore, the shape of the balancer may be changed into such a shape as to allow the first holes 12 and the tab portions 11 to be exposed. Alternatively, in the end plate 101, at a part where the balancer is not located, the first holes 12 and the tab portions 11 may be provided, and at a part where the balancer is located, only the first holes 12 may be provided without providing the tab portions 11. Alternatively, the balancer may be regarded as a part of the end plate 101, and the first holes and the tab portions may be provided to the balancer.

In the present embodiment 1, the case where the rotor 1 is formed with six poles has been shown as an example. However, without limitation thereto, for example, four poles or eight poles may be employed and the effects can be obtained not depending on the number of poles. As for the shapes of the permanent magnets and the magnet holes, straight shapes perpendicular to the axial direction Y have been shown as an example. However, without limitation thereto, the same effects can be obtained even by other shapes and configurations such as V shape or U shape.

The configuration of the stator may be a concentrated winding type or a distributed winding type. Also, as for the number of slots thereof, 6 slots, 9 slots, 12 slots, etc., may be employed for the concentrated winding type, and 24 slots, 32 slots, etc., may be employed for the distributed winding type. Thus, it is possible to select from many options and they are not limited to specific ones.

Embodiment 2

In the above embodiment 1, the case where the tab portions 11 for assisting air intake and the first holes 12 serving as intake ports are provided to both end plates 100, 101 at both ends, has been shown. However, the configuration is not limited thereto. In the present embodiment 2, the case where the tab portions 11 for assisting air intake and the first holes 12 serving as intake ports are provided to only one end plate 100, will be described. It is noted that the components are the same as those in the above embodiment 1. Therefore, the same parts are denoted by the same reference characters and the description thereof is omitted. In the present embodiment 2, only flow F of the coolant, which is different from that in the above embodiment 1, will be described.

Figure 8:
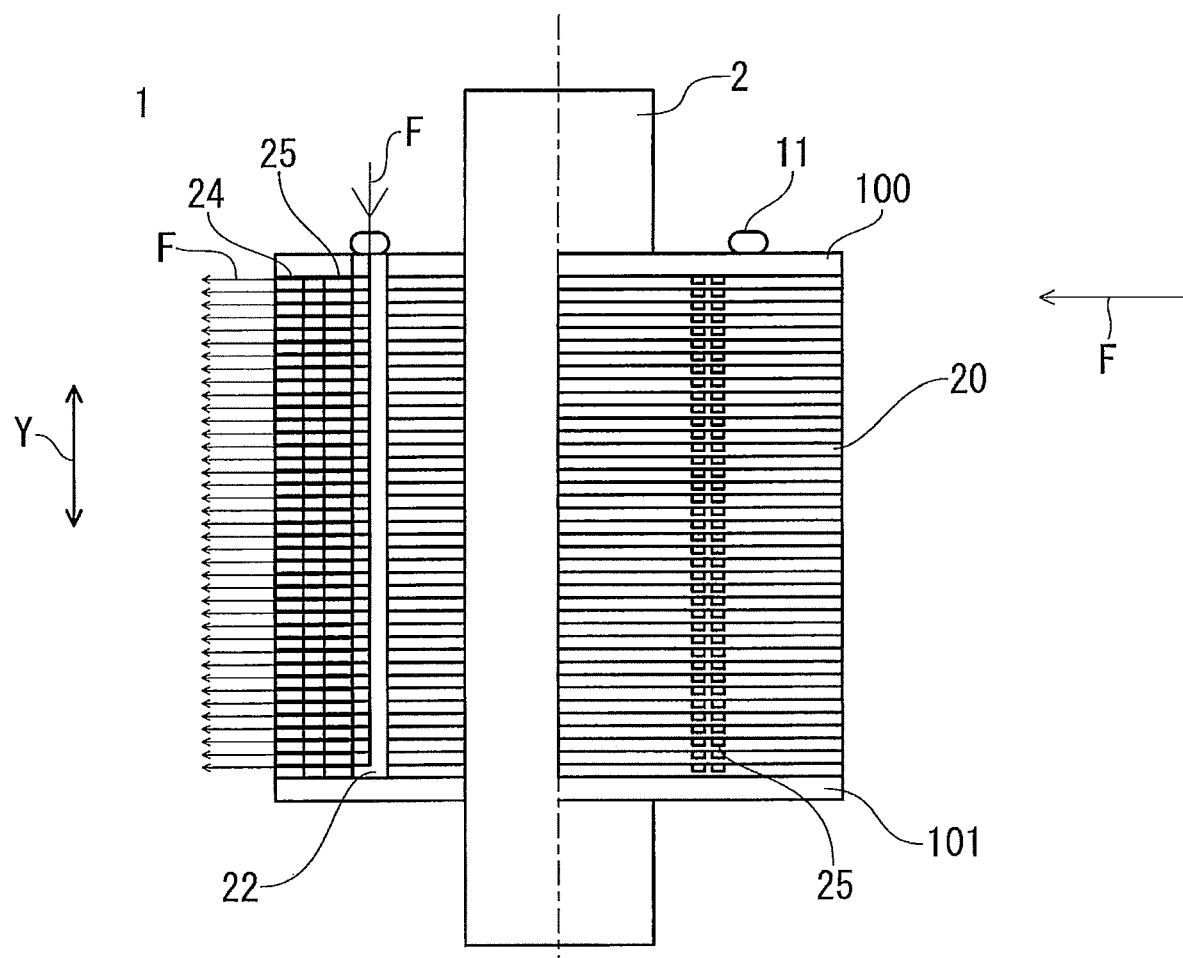
FIG. 8 is a half sectional view showing flow of a coolant in a rotor according to embodiment 2 of the present invention.
Figure 9:
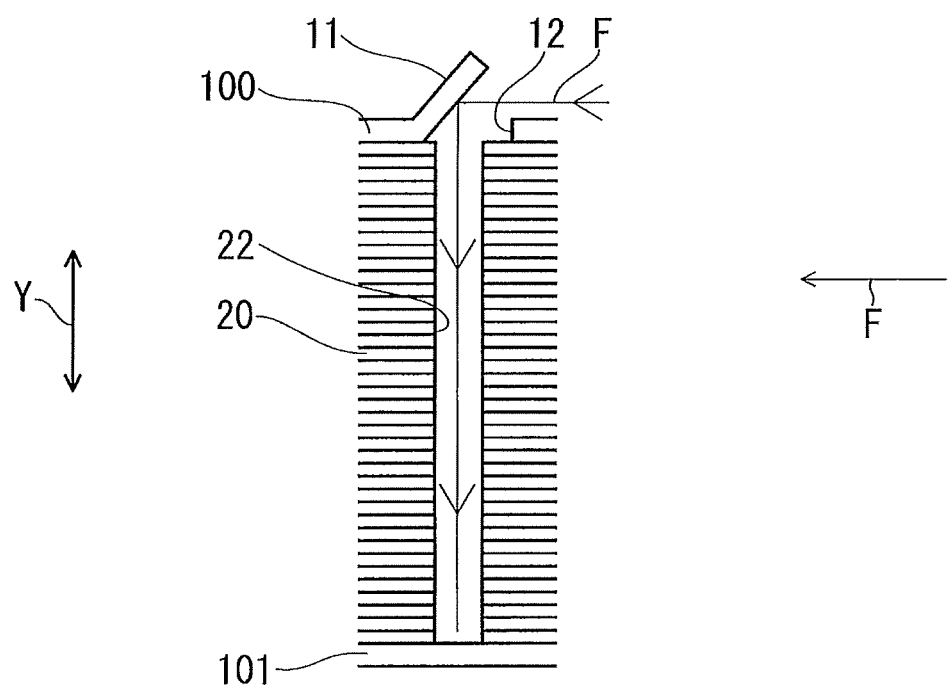
FIG. 9 is an enlarged sectional view showing the details of flow of the coolant in the rotor shown in FIG. 8.

FIG. 8 is a left-half sectional view showing flow F of the coolant in a rotor according to embodiment 2 of the present invention. FIG. 9 is an enlarged sectional view showing the details of flow F of the coolant in the rotor shown in FIG. 8. As shown in the drawings, the tab portions 11 and the first holes 12 are provided to only the end plate 100 on the upper side in the axial direction Y of the stacked core 20. The tab portions 11 and the first holes 12 are not provided to the end plate 101 on the lower side.

In the rotor of embodiment 2 configured as described above, the coolant can be supplied from a specific side in the axial direction of the rotor, here, from the upper side in the axial direction in the drawings, i.e., from above to below in the axial direction. For example, in the case of a compressor in which one side is near a compression mechanism portion and another side is near a side where compressor oil is stored as in a compressor having a low-pressure shell structure, supply of the coolant from the side where refrigerating machine oil is stored is blocked, whereby sucking of oil contained in the coolant is restricted, and cooling can be performed using only the coolant having a relatively low temperature.

In the case of desiring to suppress rising of oil of the compressor (due to the flow state of coolant gas, a large amount of lubricating oil is ejected to outside of the compressor together with the coolant), the coolant is sucked from the compression mechanism portion side, and refrigerating machine oil is ejected to the stator side and thus can be dropped to the opposite side end. In this case, the first groove portions and the second groove portions may be provided so as to be concentrated in a lower half region of the axial-direction length of the stacked core. Conversely, in the case of desiring to perform cooling by both of the coolant and refrigerating machine oil in order to prioritize the efficiency of the compressor, the tab portions and the first holes are not provided to the end plate on the side near the compression mechanism portion, and the tab portions and the first holes are provided to the end plate on the side where refrigerating machine oil is stored. Thus, the coolant containing a large amount of oil can be utilized and the amount by which the coolant having a temperature increased as a result of cooling moves to the compression mechanism side can be decreased, whereby reduction in the compressor efficiency can be suppressed.

The configurations shown in the above embodiment 1 and embodiment 2 are merely examples. The formation locations and the shapes of the tab portions 11 and the first holes 12 are not limited to those shown in the above embodiments. The tab portions 11 and the first holes 12 may be formed at appropriate locations and in appropriate shapes in accordance with the characteristics of the rotor and the rotary electric machine.

Embodiment 3

Figure 10:
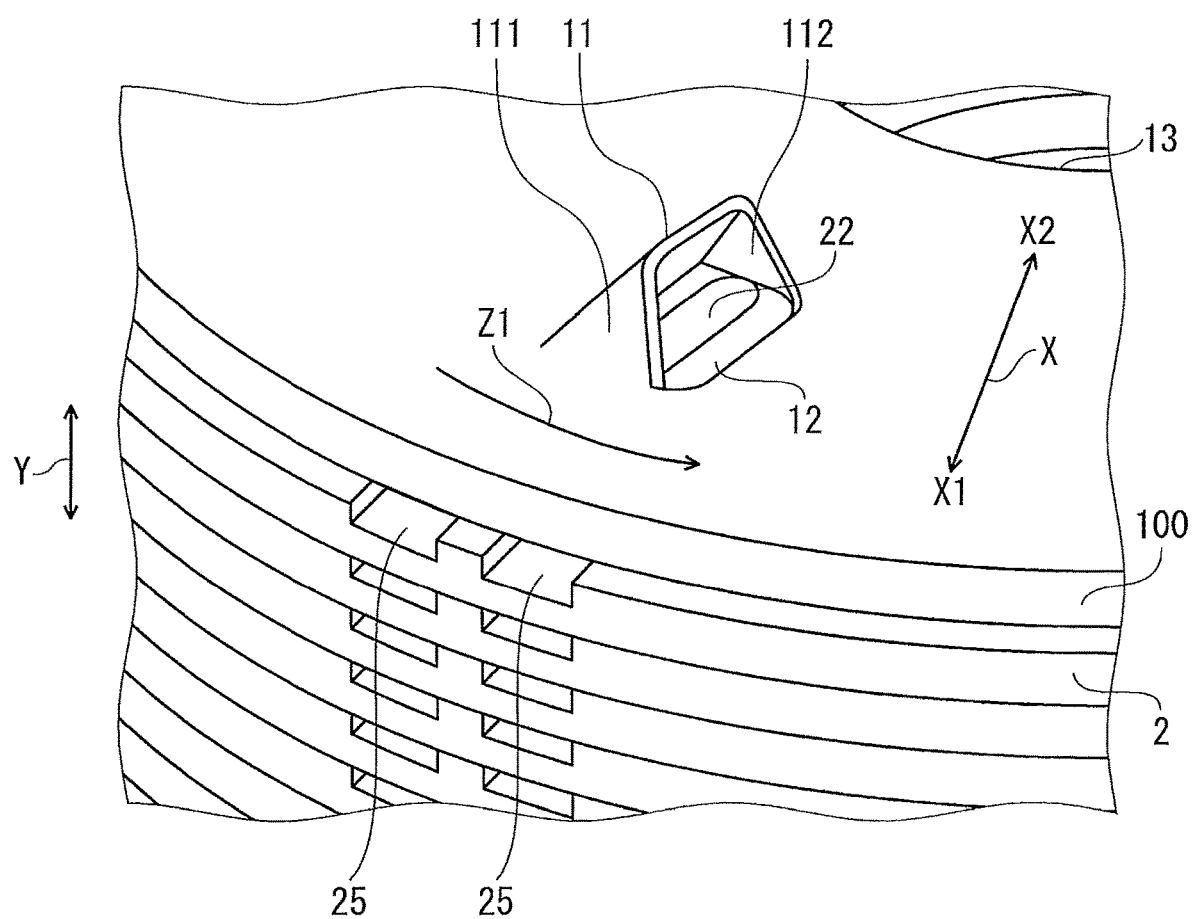
FIG. 10 is a perspective view showing the details of a tab portion according to embodiment 3 of the present invention.

In the following embodiments, description will be given on only one of the end plates. However, the end plates at both ends may be formed in the same manner, and the description for such a case is omitted as appropriate. FIG. 10 is a perspective view showing the configuration of a tab portion of a rotor according to embodiment 3 of the present invention. In the drawing, the same parts as those in the above embodiments are denoted by the same reference characters and the description thereof is omitted. The tab portion 11 has a side wall portion 111 extending in the axial direction Y on the outer side X1 in the radial direction X, and a side wall portion 112 extending in the axial direction Y on the inner side X2 in the radial direction X. The side wall portions 111, 112 are formed contiguously to the end plate 100.

With the rotary electric machine of embodiment 3 configured as described above, the same effects as in the above embodiments are provided and furthermore, the coolant escaping in the radial direction after colliding with the tab portion can be captured by the side wall portions. Thus, the capability of supplying the coolant to the flow hole can be improved, the permanent magnets and the coils of the stator can be more efficiently cooled, and the efficiency of the rotary electric machine is further improved.

In the above embodiment 3, the case where the side wall portions 111, 112 are formed on both of the outer side X1 and the inner side X2 in the radial direction X of each tab portion 11, has been shown as an example, but the configuration is not limited thereto. The coolant escaping in the radial direction X is more likely to escape toward the outer side X1, in the radial direction X, which is particularly subjected to a centrifugal force. Therefore, it is also conceivable to provide only the side wall portion 111 on the outer side X1 in the radial direction X without providing the side wall portion 112 on the inner side X2 in the radial direction X. Also in this case, coolant supply capability is improved and the same effects as in the above embodiment 3 can be obtained.

In FIG. 10, the case where the side wall portions 111, 112 are formed contiguously to the tab portion 11 and the end plate 100, is shown as an example. As the forming method therefor, drawing working or the like may be employed. As another method, it is also possible to form the side wall portions 111, 112 by lancing. In this case, for example, the side wall portions 111, 112 are formed by being bent and therefore are contiguous to the tab portion 11, while there are slits between the side wall portions 111, 112 and the end plate 100. However, the same effects as in the above embodiment 3 can be obtained.

Embodiment 4

Figure 11:
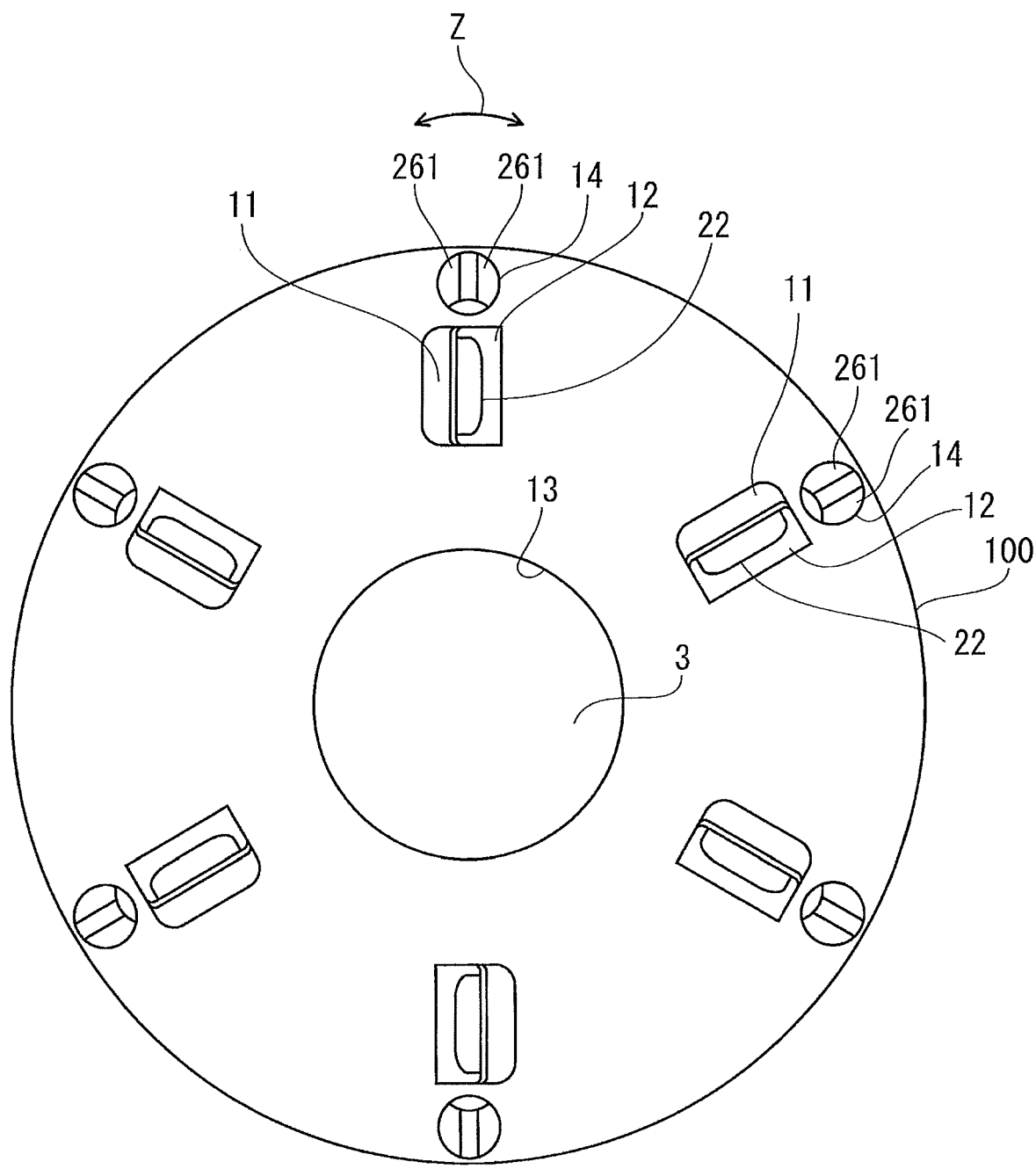
FIG. 11 is a plan view showing the configuration of an end plate of a rotor according to embodiment 4 of the present invention.

FIG. 11 is a top view showing the shape of an end plate of a rotor of a rotary electric machine according to embodiment 4 of the present invention. In the drawing, the same parts as those in the above embodiments are denoted by the same reference characters and the description thereof is omitted. The end plate 100 has second holes 14 through which the void portions 261 of the magnet holes 26 are exposed.

With the rotary electric machine of embodiment 4 configured as described above, the same effects as in the above embodiments are provided and furthermore, since the second holes are added, the coolant is supplied in the axial direction to the void portions in which no permanent magnets are present in the magnet holes, whereby the coolant supply capability is expected to be further improved. Here, the case where the shape of the second holes is a round shape has been shown as an example, but without limitation thereto, the same effects can be obtained by any shapes such as an oval, an ellipse, a quadrangle, and a rectangle that allow the void portions of the magnet holes to be exposed. The second holes may be formed such that the outer peripheral parts of the end plate are also cut, whereby the same effects can be obtained.

Figure 12:
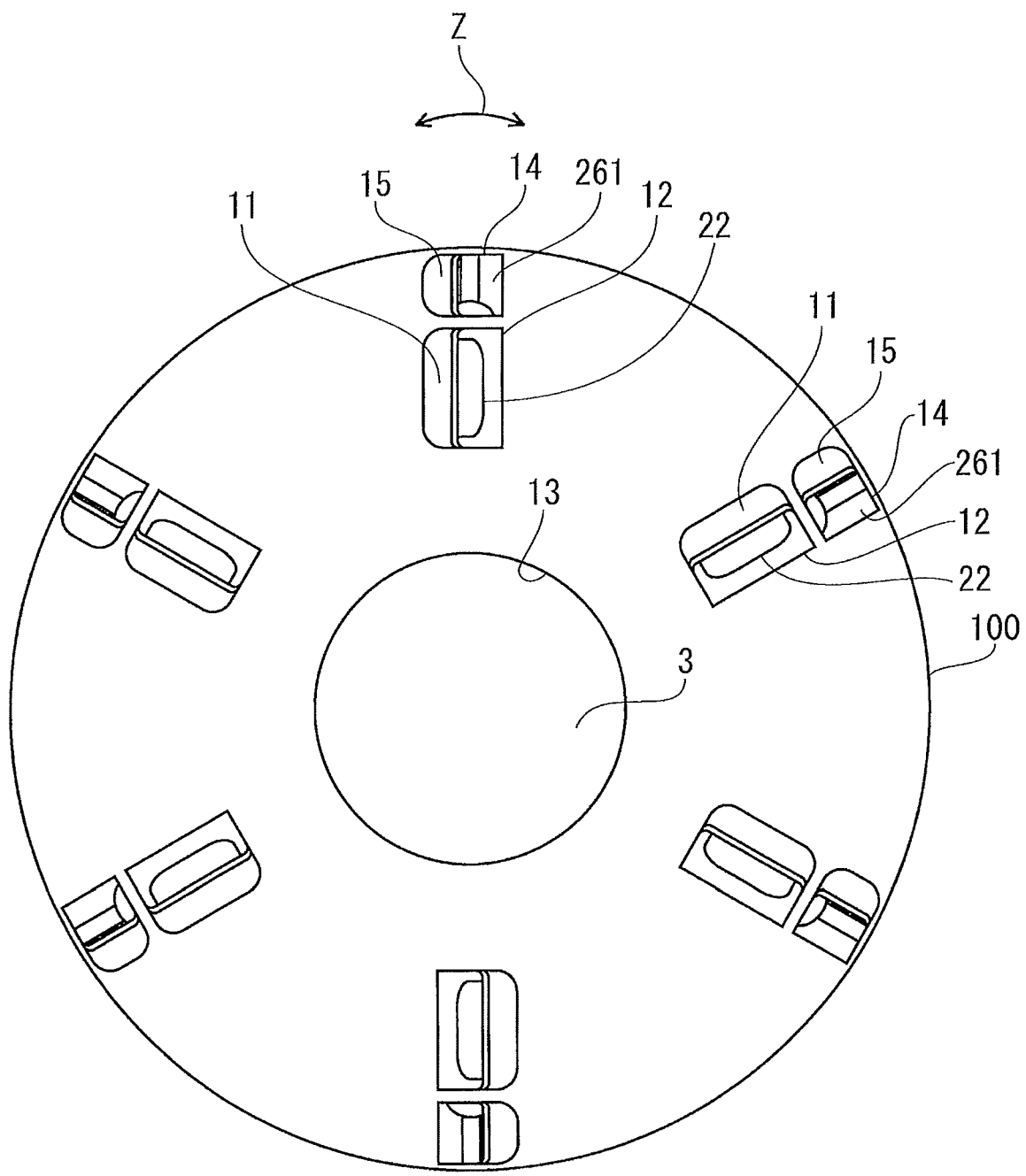
FIG. 12 is a plan view showing another configuration of an end plate of the rotor according to embodiment 4 of the present invention.
Figure 13:
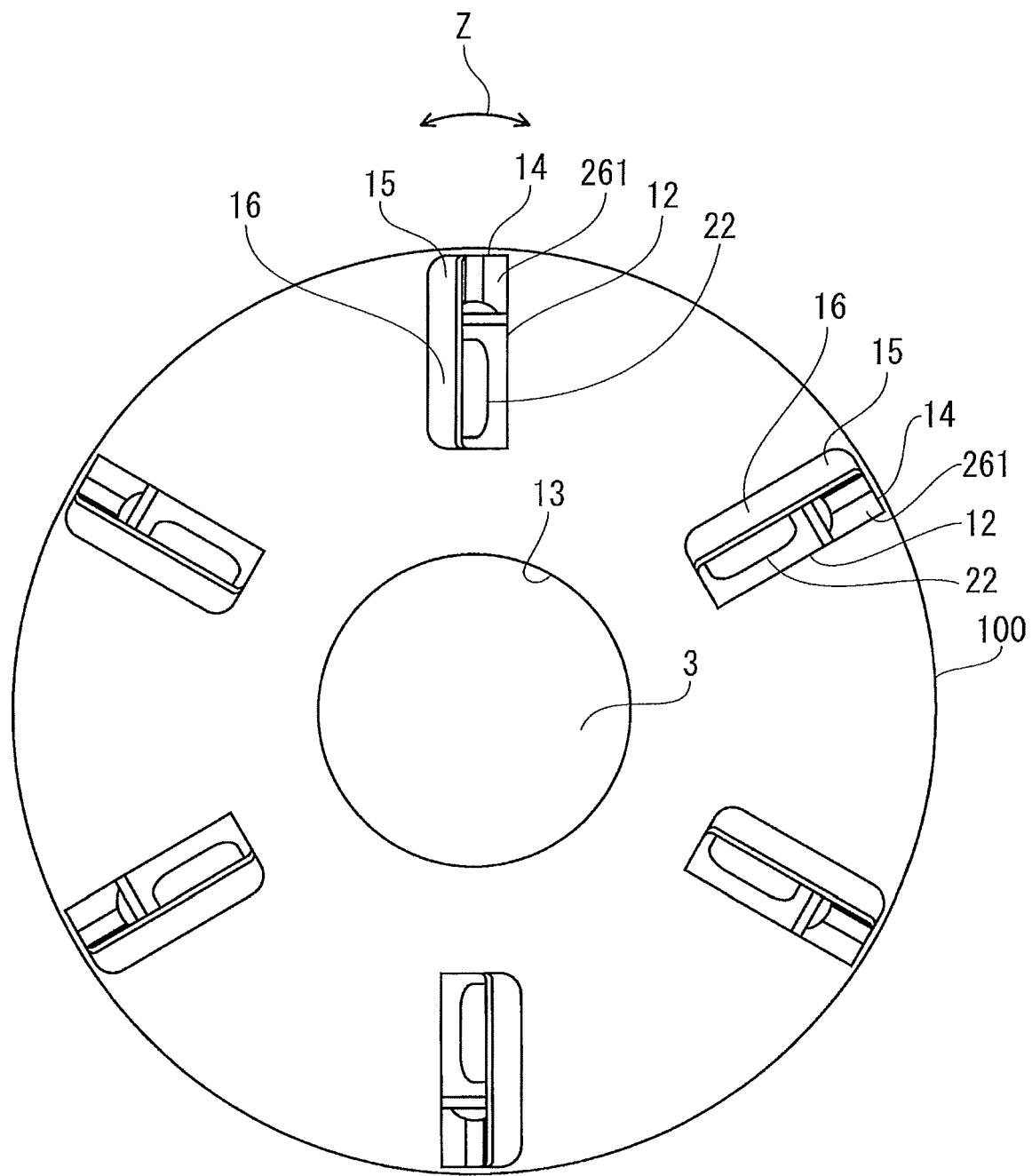
FIG. 13 is a plan view showing still another configuration of an end plate of the rotor according to embodiment 4 of the present invention.

As shown in FIG. 12, as in the tab portions 11 of the first holes 12, tab portions 15 may be also provided to the second holes 14, whereby the coolant supply capability can be further improved. Instead of separately providing the tab portions 11, 15 to the first holes 12 and the second holes 14 as shown in FIG. 12, one tab portion 16 may be provided to each set of the first hole 12 and the second hole 14 as shown in FIG. 13.

Embodiment 5

Figure 14:
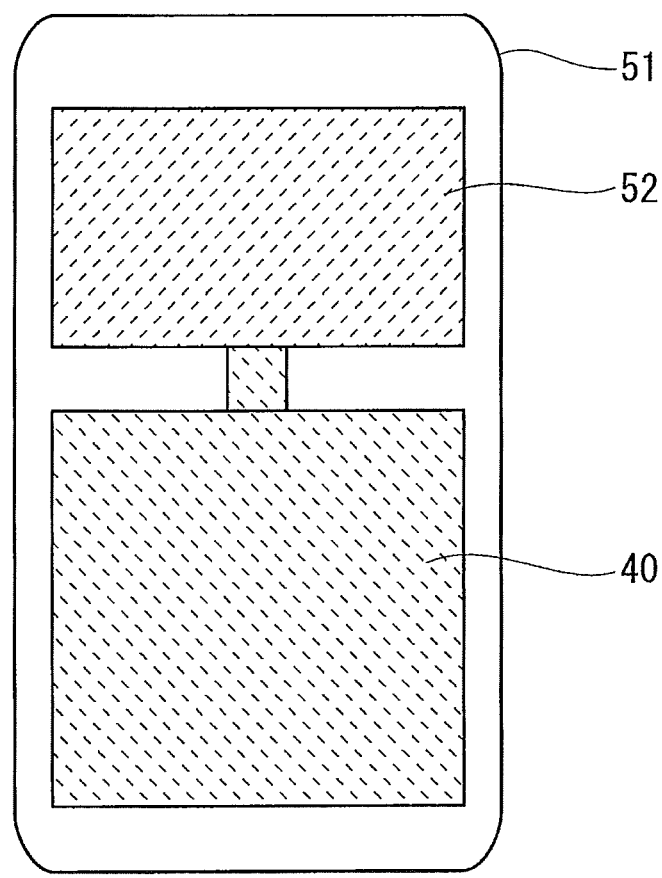
FIG. 14 is a sectional view showing the configuration of a compressor according to embodiment 5 of the present invention.

FIG. 14 is a schematic sectional view showing the configuration of a compressor according to embodiment 5 of the present invention. In FIG. 14, a compressor 50 includes: a shell 51 forming the exterior; a compression mechanism portion 52 provided inside the shell 51; and the rotary electric machine 40 of any of the above embodiments for driving the compression mechanism portion 52.

The rotary shaft of the rotor of the rotary electric machine 40 is connected to, for example, a swing scroll component of the compression mechanism portion 52. Thus, the compression mechanism portion 52 is driven by driving of the rotary electric machine 40.

In the compressor of embodiment 5 configured as described above, since the rotary electric machine of any of the above embodiments 1 to 4 is used, the same effects as in each embodiment are provided and furthermore, the efficiency of the rotary electric machine is improved and therefore performance of the compressor is excellent.

The above rotors and rotary electric machines are not limited to mounting to a compressor as shown in the above embodiment 5, and needless to say, the above rotors and rotary electric machines are also applicable to rotary electric machines used in other fields, e.g., rotary electric machines having an IPM structure such as an industrial motor or an on-vehicle motor, whereby improvement of the efficiency is expected.

It is noted that, within the scope of the present invention, the above embodiments may be freely combined with each other, or each of the above embodiments may be modified or simplified as appropriate.

DESCRIPTION OF THE REFERENCE CHARACTERS 1 rotor
3 rotary shaft
11 tab portion
111 side wall portion
112 side wall portion
12 first hole
13 through hole
14 second hole
20 stacked core
2 core
21 permanent magnet
22 flow hole
24 first groove portion
25 second groove portion
26 magnet hole
261 void portion
30 stator
31 stator core
32 winding
40 rotary electric machine
50 compressor
51 shell
52 compression mechanism
F flow of coolant
Y axial direction
Z circumferential direction
Z1 rotation direction
X radial direction
X1 outer side
X2 inner side

The invention claimed is:

1. A rotor comprising:
a stacked core formed by stacking a plurality of cores;
permanent magnets provided in magnet holes formed to penetrate in an axial direction in the stacked core;
end plates provided at both ends in the axial direction of the stacked core; and
a rotary shaft provided to a through hole formed at a center in the stacked core and the end plates, the rotary shaft fixing the stacked core and the end plates, wherein
a plurality of the magnet holes in which the permanent magnets are provided are arranged in a circumferential direction,
void portions in which the permanent magnets are not present are provided at both ends in the circumferential direction of each magnet hole,
the stacked core has flow holes which penetrate in the axial direction and each of which is formed, between the magnet holes adjacent in the circumferential direction, on an inner side in a radial direction with respect to the magnet holes, some or all of the cores have, first groove portions via which the void portions of the magnet holes and the flow holes communicate with each other, wherein a width of the first groove portions in the circumferential direction is less than or equal to a width of the flow holes in the circumferential direction, and second groove portions via which the void portions of the magnet holes and outer circumferences of the cores communicate with each other and which serve as discharge ports, and the cores have flow paths formed through the flow holes, the first groove portions, the void portions, and the second groove portions so as to communicate with outside of the cores linearly in the radial direction, and at least one of the end plates has first holes through which the flow holes are exposed and which serve as intake ports, and tab portions which are located on downstream sides in a rotation direction of the first holes and which assist air intake.

2. The rotor according to claim 1, wherein
the tab portions and the first holes are provided to only one of the end plates.

3. The rotor according to claim 1, wherein
the tab portions and the first holes are provided to both of the end plates.

4. The rotor according to claim 1, wherein
at least one of the end plates has second holes through which the void portions of the magnet holes are exposed.

5. The rotor according to claim 4, wherein
the tab portions are formed to extend to downstream sides in the rotation direction of the second holes.

6. The rotor according to claim 1, wherein
an angle between a surface on a first hole side of each tab portion and an end surface of each end plate is 30 deg to 60 deg.

7. The rotor according to claim 1, wherein
each tab portion has side wall portions extending in the axial direction, on an outer side in the radial direction.

8. The rotor according to claim 1, wherein
the flow holes and the first holes each have such a shape that a width in the radial direction is greater than a width in the circumferential direction.

9. A rotary electric machine comprising:
the rotor according to claim 1; and
a stator provided so as to be spaced from an outer circumferential surface of the rotor and concentric with the rotor.

10. A compressor comprising:
a compression mechanism portion; and
the rotary electric machine according to claim 9, which drives the compression mechanism portion.

11. The rotor according to claim 1, wherein
the cores are formed from thin sheets, and the first groove portions and the second groove portions of the cores are formed by decreasing thicknesses of the thin sheets.

12. The rotor according to claim 2, wherein
the cores are formed from thin sheets, and the first groove portions and the second groove portions of the cores are formed by decreasing thicknesses of the thin sheets.

13. The rotor according to claim 3, wherein
the cores are formed from thin sheets, and the first groove portions and the second groove portions of the cores are formed by decreasing thicknesses of the thin sheets.

14. The rotor according to claim 4, wherein
the cores are formed from thin sheets, and the first groove portions and the second groove portions of the cores are formed by decreasing thicknesses of the thin sheets.

15. The rotor according to claim 5, wherein
the cores are formed from thin sheets, and the first groove portions and the second groove portions of the cores are formed by decreasing thicknesses of the thin sheets.

16. The rotor according to claim 6, wherein
the cores are formed from thin sheets, and the first groove portions and the second groove portions of the cores are formed by decreasing thicknesses of the thin sheets.

17. The rotor according to claim 7, wherein
the cores are formed from thin sheets, and the first groove portions and the second groove portions of the cores are formed by decreasing thicknesses of the thin sheets.

18. The rotor according to claim 8, wherein
the cores are formed from thin sheets, and the first groove portions and the second groove portions of the cores are formed by decreasing thicknesses of the thin sheets.

19. The rotor according to claim 1, wherein
entireties of the flow holes are exposed through the first holes.

20. The rotor according to claim 19, wherein
the cores are formed from thin sheets, and the first groove portions and the second groove portions of the cores are formed by decreasing thicknesses of the thin sheets.

* * * * *